United States Patent [19]

Hiraga et al.

[11] 4,377,562

[45] Mar. 22, 1983

[54] SOLVENT EXTRACTION METHOD OF PHOSPHORIC ACID

[75] Inventors: Yoichi Hiraga, Shin-nanyo; Osamu Watanabe, Tokuyama, both of Japan

[73] Assignee: Toyo Soda Manufacturing Co., Ltd., Shin-nanyo, Japan

[21] Appl. No.: 309,774

[22] Filed: Oct. 8, 1981

[30] Foreign Application Priority Data

Nov. 29, 1980 [JP] Japan .................. 55-168681

[51] Int. Cl.³ .......................................... C01B 25/16
[52] U.S. Cl. .............................................. 423/321 S
[58] Field of Search ................ 423/320, 321 R, 321 S

[56] References Cited

U.S. PATENT DOCUMENTS

| | | | |
|---|---|---|---|
| 3,867,511 | 2/1975 | Chiang et al. | 423/321 |
| 3,872,215 | 3/1975 | Cherdron et al. | 423/309 |
| 3,903,247 | 9/1975 | Blumberg et al. | 423/321 |
| 3,970,741 | 7/1976 | Pavonet | 423/321 |
| 4,127,640 | 11/1978 | Williams | 423/321 S |
| 4,197,280 | 4/1980 | Jassal | 423/321 S |
| 4,222,994 | 9/1980 | Ehlers et al. | 423/321 |

FOREIGN PATENT DOCUMENTS 1129793 10/1968 United Kingdom ............ 423/321 S

*Primary Examiner*—O. R. Vertiz
*Assistant Examiner*—Gregory A. Heller
*Attorney, Agent, or Firm*—Oblon, Fisher, Spivak, McClelland & Maier

[57] ABSTRACT

A method for solvent extraction of phosphoric acid comprises counter-currently contacting an impure phosphoric acid solution containing at least 45 wt. % of $P_2O_5$ with a partially water-miscible solvent in the presence of sulfuric acid, and which is characterized in that (a) as said solvent, a solvent in which from 3 to 10 wt. % of water is soluble, is used, and (b) sulfuric acid is added to a place where the $H_3PO_4$ concentration in the aqueous phase is at most 3 mol./l so as to bring the relation between the free sulfuric acid concentration (Y (mol/l)) and the $H_3PO_4$ concentration (X (mol/l)) in the aqueous phase of the same place to satisfy the formula $$5.0 - 0.83X \geq Y \geq 2.5 - 0.83X$$

within the range of the $H_3PO_4$ concentration in the aqueous phase being from 0.5 to 3 mol/l.

4 Claims, 1 Drawing Figure

SOLVENT EXTRACTION METHOD OF PHOSPHORIC ACID

BACKGROUND OF THE INVENTION

1. Field of the Invention

The present invention relates to a method for solvent extraction of phosphoric acid from a highly concentrated impure phosphoric acid solution containing at least 45 wt.% of $P_2O_5$, in high yield by a counter current extraction.

Certain terms used in the specification will be defined as follows:

The "water solubility wt.%" represents "an amount in gram of water/100 g. of the solution at room temperature".

The "free sulfuric acid concentration by mol/l" is a half of the value obtained by subtracting the value of the $H_3PO_4$ concentration (mol/l) from the value of the H+ concentration (gram ion/l) obtained by titration with an aqueous sodium hydroxide solution using Bromophenol Blue as an indicator.

phoric acid obtained by decomposing a phosphate rock with sulfuric acid and removing solids by filtration, or by adjusting its concentration or by subjecting it to pretreatment such as removal of sulfates, silicates, fluorine or organic matters.

The "extraction battery" means a battery for extracting phosphoric acid into a solvent phase by counter-currently contacting a solvent with an aqueous impure phosphoric acid solution and an aqueous phase discharged from the purification battery. The present invention is concerned with this extraction battery.

The "purification battery" means a battery for extracting impurities contained in the extracted solution into an aqueous phase by counter-currently contacting the extracted solution from the extraction battery with high purity water or aqueous phosphoric acid solution.

The "wash solution" means the above-mentioned high purity water or aqueous phosphoric acid used in the purification battery.

The "stripping battery" means a battery for obtaining an aqueous solution of purified phosphoric acid or phosphate by counter-currently contacting the solvent phase from the purification battery with high purity water or aqueous alkali solution.

The solvent for extracting phosphoric acid from a highly concentrated impure phosphoric acid solution by a counter-current method (the solvent being hereinafter referred to as "a solvent for a highly concentrated solution"), must form two phases when contacted with such a phosphoric acid solution. As such a solvent, there are known, for instance, aliphatic alchols having from 6 to 10 carbon atoms, ketones such as methyl isobutyl ketone, ethers such as diisopropyl ether and alkyl phosphates such as tributyl phosphate. However, with these solvents (except for the alkyl phosphates), the yield of phosphoric acid was at best as low as from 50 to 60%. In order to increase the yield by counter current extraction, it is necessary that adequate extraction of phosphoric acid must even at the location near the outlet of the raffinate where the concentration of phosphoric acid is naturally low. However, known types of solvents for a highly concentrated solution normally have an extremely poor ability for extracting phosphoric acid in this low concentration region. For instance, 2-ethyl hexanol having 8 carbon atoms forms two phases when contacted with a wet process phosphoric acid containing even 50 wt.% of $P_2O_5$, but it is scarcely capable of extracting phosphoric acid from an aqueous phase containing less than 20 wt.% of $P_2O_5$.

On the other hand, n-butanol, isobutanol, etc. are known as solvents which are capable of adequately extracting phosphoric acid at the low concentration region. However, these solvents do not form two phases when contacted with a wet process phosphoric acid containing at least 45 wt.% of $P_2O_5$ as they tend to be homogeneously mixed therewith, and accordingly, they are not suitable as solvents for a highly concentrated solution.

Further, in general, the higher the phosphoric acid concentration, the lower the selectivity for phosphoric acid in the extraction. Solvents for a highly concentrated solution have relatively good selectivity. Nevertheless, their selectivity is still dependent on the concentration of the phosphoric acid. For instance, even when a highly concentrated impure phosphoric acid solution was contacted with methyl isobutyl ketone and then the extracted solution was subjected to treatments by the purification and stripping batteries, a highly pure aqueous phosphoric acid solution was not obtainable and it was necessary to further purify it by e.g. crystallization (Japanese Unexamined Patent Publication No. 99993/1974 or U.S. Pat. No. 3,914,382).

Even in such a case, if a greater amount of the wash solution is used, it is possible to increase the purity of the phosphoric acid solution obtained from the stripping battery. However, the phosphoric acid in the aqueous phase discharged from the purification battery is recovered by supplying the aqueous phase to the extraction battery, and accordingly the amount of the aqueous phase naturally increases leading to a decrease of the concentration of the aqueous phase in the extraction battery, and accordingly leading to a decrease of the extraction yield of phosphoric acid. In order to prevent the decrease of the yield, it is necessary to increase the amount of the solvent which has a low extraction ability, depending upon the increase of the amount of the aqueous phase, and accordingly the amount of the extracted solution increases and the amount of the wash solution to be contacted therewith will have to be further increased.

The difficulty resulting from the decrease of the selectivity for phosphoric acid may be overcome if the ability of the solvent to extract phosphoric acid can be increased by certain means. In this case, even when the amount of the aqueous phase entering from the purification battery to the extraction battery increases, it is necessary only to sacrifice the high yield to some extent or to increase the amount of the solvent to some extent.

The following methods are known as methods for increasing the yield of phosphoric acid from a highly concentrated impure phosphoric acid solution.

(i) A method in which sulfuric acid is added to the feed impure phosphoric acid solution.

According to this method, the yield can be increased only by 7 to 8%. Further, there is a problem that the added sulfuric acid is extracted together with phosphoric acid.

(ii) A method in which sulfuric acid is added to the raffinate and contacted with the solvent, thereby to recover phosphoric acid contained in the raffinate (Japanese Patent Examined Publication No. 4279/1977 or U.K. Patent No. 1199042).

According to this method, a high yield is obtainable. However, the phosphoric acid concentration in the extracted solution is low. Besides the extracted solution contains sulfuric acid, and it is difficult to recover phosphoric acid therefrom.

(iii) A method in which a mixture of a dialkyl ether having from 4 to 10 carbon atoms and an aliphatic alcohol having from 3 to 8 carbon atoms is used as the solvent (Japanese Unexamined Patent Publication No. 70294/1975 or U.S. Pat. No. 3,903,247).

According to this method, the yield is at best 80%.

We have made extensive studies with a technical objective to develop a method whereby it is possible to extract phosphoric acid from a highly concentrated impure phosphoric acid solution containing at least 45 wt.% of $P_2O_5$ in higher yield than the conventional methods, e.g. as high as at least 90%, and at the same time to substantially prevent the coextraction of sulfuric acid which is added to increase the yield.

Firstly, we studied the behaviours of phosphoric acid and sulfuric acid in the extraction. The data thereby obtained are shown in the Table below.

| Free sulfuric acid concentration in the aqueous phase (mol/l) | Solubility of water in the solvent[1] (wt. %) | Distribution coefficient of phosphoric acid[2] |
| --- | --- | --- |
| 0.5 | 2.0 | 0.001 |
|  | 3.0 | 0.020 |
|  | 5.0 | 0.043 |
|  | 8.0 | 0.062 |
| 1.0 | 2.0 | 0.002 |
|  | 3.0 | 0.048 |
|  | 5.0 | 0.076 |
|  | 8.0 | 0.105 |
| 2.0 | 2.0 | 0.005 |
|  | 3.0 | 0.090 |
|  | 5.0 | 0.125 |
|  | 8.0 | 0.210 |
| 3.0 | 2.0 | 0.012 |
|  | 3.0 | 0.150 |
|  | 5.0 | 0.242 |
|  | 8.0 | 0.365 |

Note:
[1] As the solvent, a solvent mixture of methyl isobutyl ketone and n-butanol was used. The solubility of water was adjusted by changing the mixture ratio.
[2] $H_3PO_4$ concentration in the solvent phase/$H_3PO_4$ concentration in the aqueous phase, where the $H_3PO_4$ concentration in the aqueous phase was 2 mol/l.

From the results, the following facts have been confirmed.

(1) The distribution of phosphoric acid into the solvent is higher as the sulfuric acid concentration is higher.

(2) The distribution of phosphoric acid into the solvent abruptly decreases when the solubility of water in the solvent becomes lower than a certain level. On the other hand, the higher the solubility of water, the higher the distribution. However, if the solubility of water is too great, the phase separation becomes difficult or impossible. Among the systems wherein the solubility of water is the same, the phase separation is better in a system where a mixture of solvents is used than a system where a single solvent is used.

(3) The distribution of sulfuric acid into the solvent is greater as the phosphoric concentration is higher.

(4) The distribution of sulfuric acid into the solvent is not very much affected by the solubility of water so long as the solubility of water is maintained within a certain range. However, among the systems wherein the solubility of water into the solvent is the same, the distribution of sulfuric acid into the solvent is smaller in a system wherein a mixture of solvents is used as the solvent, than in a system wherein a single solvent is used.

From the foregoing facts, the following conclusions have been reached.

(5) In order to prevent the coextraction of sulfuric acid, it is necessary to lower the sulfuric acid concentration in the battery solution in the place near the outlet of the extracted solution having a high phosphoric acid concentration. Accordingly, in order to increase the yield of phosphoric acid, it is necessary to increase the sulfuric acid concentration at the place near the outlet of the raffinate having a low phosphoric acid concentration.

(6) The solvent must be selected so that the solubility of water therein falls within a certain range.

(7) A mixture of solvents is better than a single solvent from the viewpoints of the phase separability and the selectivity for phosphoric acid.

On the basis of the foregoing knowledge, we have conducted a further study and have found that it is possible to accomplish the above-mentioned technical objective, and thus, the present invention has been accomplished.

SUMMARY OF THE INVENTION

Namely, it is an object of the present invention to accomplish the above-mentioned technical objective.

The present invention provides a method for extracting phosphoric acid with a solvent which comprises counter-currently contacting an impure phosphoric acid solution containing at least 45 wt.% of $P_2O_5$ with a partially water-miscible solvent in the presence of sulfuric acid, and which is characterized in that (a) as said solvent, a solvent in which from 3 to 10 wt.% of water is soluble, is used, and (b) sulfuric acid is added to a place where the $H_3PO_4$ concentration in the aqueous phase is at most 3 mol/l so as to bring the relation between the free sulfuric acid concentration ($Y$ (mol/l)) and the $H_3PO_4$ concentration ($X$ (mol/l)) in the aqueous phase of the same place to satisfy the formula $$5.0 - 0.83X \geq Y \geq 2.5 - 0.83X$$

within the range of the $H_3PO_4$ concentration in the aqueous phase being from 0.5 to 3 mol/l.

Now, the invention will be described in detail.

DETAILED DESCRIPTION OF THE PREFERRED EMBODIMENTS

Feed of Impure Phosphoric Acid Solution

Figure 1:
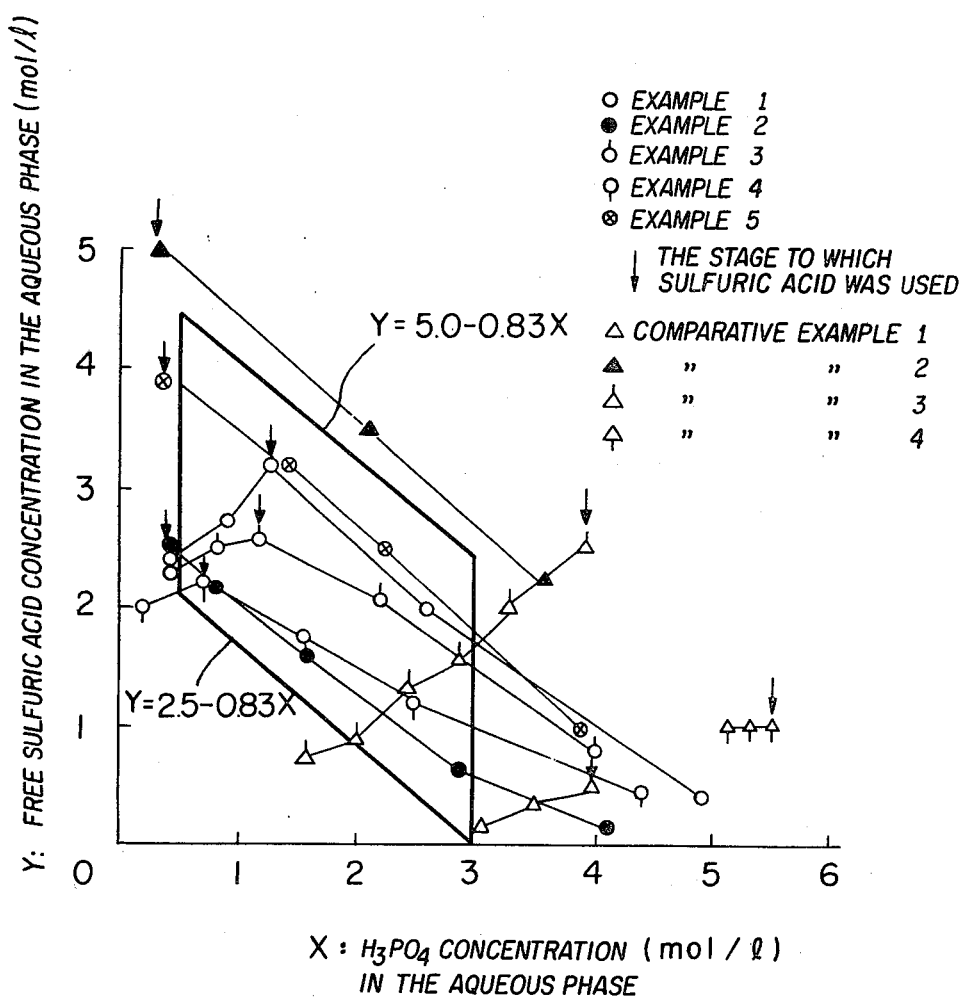
FIG. 1 is a graph illustrating the relation between the free sulfuric acid concentration and the $H_3PO_4$ concentration in a part of the aqueous phase in the extraction battery with respect to Examples 1 to 5 and Comparative Examples 1 to 4.

The present invention is directed to treatment of a highly concentrated impure phosphoric acid solution containing at least 45 wt.% of $P_2O_5$, which was hardly treated by the conventional methods. According to the present invention, such a highly concentrated solution is used as the feed material, and phosphoric acid can be extracted in high yield with use of a small amount of the solvent. Accordingly, the installation required for the extraction battery used in carrying out the present invention may be made in a smaller scale, and further it is possible to simplify the treatments of the extracted solution and the raffinate obtainable according to the present invention.

The present invention is applicable to the extraction of phosphoric acid from various types of phosphoric acid solutions containing impurities, including wet process phosphoric acids. Among various wet process phosphoric acids presently commercially available, the one having the highest concentration contains about 54 wt.% of $P_2O_5$. According to the present invention, it is possible to effectively treat such a highly concentrated material.

Solvent

The solvent which is used in the present invention must be the one in which from 3 to 10 wt.% of water is soluble. If the solubility of water is less than 3 wt.%, the distribution of phosphoric acid into the solvent abruptly decreases. On the other hand, if the solubility is greater than 10 wt.%, the solvent, upon contact with the highly concentrated starting material, tends to mix homogeneously therewith thus failing to form two phases, or even when two phases are formed, their compositions tend to be alike and differences in the specific gravity and interfacial tension between them will be minimal, and accordingly an emulsion will be formed or the rate of phase separation will be extremely low.

In a system where the concentration of phosphoric acid is low, rather than a single solvent in which from 3 to 10 wt.% of water is soluble, for instance, 3-pentanol, 3-hexanol, or n-octanol, a mixture of two or more, particularly a mixture obtained by mixing at least one of solvents wherein less than 3 wt.% of water is soluble and at least one of solvents wherein more than 10 wt.% of water is soluble, to bring the solubility of water to fall within a range of from 3 to 10 wt.%, is superior, provided that the solubility of water is the same.

(If the phase separability is poor in a system of a low phosphoric acid concentration, it would become difficult to obtain purified phosphoric acid in high yield by the treatment of the extracted solution obtained by the present invention by the purification battery and the stripping battery. At the outlet of the solvent phase in the stripping battery, the concentration of phosphoric acid naturally becomes low, and if the phase separation at this place is not adequate, the recovered solvent would contain a substantial amount of phosphoric acid, and if such a solvent is recycled to the extraction battery, the phosphoric acid contained therein will be extracted into the raffinate and will be lost. According to the present invention, the yield of phosphoric acid is high, and accordingly the phosphoric acid concentration in the raffinate is extremely low, and thus, the abovementioned influence due to poor phase separability is great.)

Further, the distribution of impurities such as sulfuric acid into the solvent is smaller with the solvent mixture than with a single solvent, and the solvent mixture has a higher selectivity for phosphoric acid than the single solvent. (Accordingly, the amount of sulfuric acid added may be smaller in the case of the solvent mixture. Further, when the extracted solution obtained by the present invention is treated by the purification battery, the amount of the wash solution may be less in the case of the solvent mixture.)

Further, the solvent mixxture is advantageous also from the viewpoints of adjustment of the solubility of water therein, availability of solvents, and selection of solvents which are stable in the acid mixture of phosphoric acid and sulfuric acid.

As the solvent mixture, there may be mentioned, for instance, a mixture composed of at least one member selected from aliphatic alcohols having at most 6 carbon atoms and alicyclic alcohols, and at least one member selected from aliphatic alcohols having from 7 to 10 carbon atoms, methyl isobutyl ketone and diisopropyl ether. Specifically, there may be mentioned, as two component mixtures, methyl isobutyl ketone/n-butanol = from 90/10 to 50/50 (volume ratio, the same is true hereinafter), methyl isobutyl ketone/i-butanol = from 90/10 to 40/60, methyl isobutyl ketone/cyclohexanol = from 80/20 to 20/80, diisopropyl ether/i-butanol = from 70/30 to 30/70, and 2-ethylhexanol/n-butanol = from 90/10 to 50/50; as three component mixtures, methyl isobutyl ketone/diisopropyl ether/n-butanol, and methyl isobutyl ketone/isoamyl alcohol/n-butanol.

The amount of the solvent is preferably in a weight ratio of from 5 to 12 in a weight ratio of the solvent/the raffinate, whereby it is possible to obtain an effective action of sulfuric acid which will be described hereinafter. The reason for setting the raffinate as the base is that the sulfuric acid is used to act at the place near the outlet of the raffinate. The amount of the aqueous phase usually gradually decreases from the outlet of the extracted solution towards the outlet of the raffinate. The degree of the decrease is dependent on the concentrations of $P_2O_5$ and impurities in the feed aqueous phase, and in the present invention, the decrease is particularly remarkable. Accordingly, the above-mentioned values do not indicate that the amount of the solvent used is great. The amount of the solvent on the basis of the feed aqueous phase, may normally be within a range of from 1.5 to 3.5 in a weight ratio of the solvent/the feed aqueous phase.

Type of Extraction

The present invention can be carried out by means of a commonly used type of an extractor such as a rotating disk extractor, or mixer-settler type extractor. Namely, the extractor may be of type wherein the solvent phase and the aqueous phase undergo either continuous or stepwise change of their compositions during their transfer from the outlet of the extracted solution (or the inlet of the feed) to the outlet of the raffinate (or the inlet of the solvent). If the number of theoretical stages between the inlet of sulfuric acid and the outlet of the raffinate is too small, it is required to use a great amount of sulfuric acid to satisfy the requirement of the present invention and as a result, sulfuric acid will be wasted as free sulfuric acid contained in the raffinate, and on the other hand, there is no advantage to increase the number of the stages too much. From two to four stages are suitable. On the other hand, if the number of theoretical stages between the inlet of sulfuric acid and the outlet of the extracted solution is too small, it would be impossible to satisfy the requirements of the present invention and if the number is too great, there will be an excess length of stages where an equilibrium is established between the solvent phase and water phase and no material transfer takes place, and such does not bring about any advantages. From 5 to 8 stages are suitable.

Addition of Sulfuric Acid

Hydrochloric acid or nitric acid are also effective to increase the yield of phosphoric acid. However, they are likely to be extracted by the solvent, and accordingly, it is difficult to prevent their coextraction with the phosphoric acid. Further, hydrochloric acid tends to form a complex ion together with impurities, and thus hinders the separation of the impurities from phosphoric acid. On the other hand, sulfuric acid is extracted to a lesser extent by the solvent than hydrochloric acid or nitric acid, and does not form a complex ion.

For this reason, sulfuric acid has been chosen as the acid for improving the yield according to the present invention.

The present invention is intended not to have the added sulfuric acid accompany the extracted solution and to extract phosphoric acid in high yield. It is possible to prevent the extraction of sulfuric acid into the solvent by reducing the concentration of sulfuric acid and the concentration of phosphoric acid which acts for the extraction of sulfuric acid into the solvent, in the system as far as possible. On the other hand, in order to increase the yield of phosphoric acid, it is necessary to increase the concentration of sulfuric acid which acts for the extraction of phosphoric acid into the solvent and the concentration of phosphoric acid as far as possible. Thus, the condition for preventing the extraction of sulfuric acid into the solvent is contradictory to the conditions for increasing the yield of phosphoric acid. According to the present invention, this contradiction has been overcome, and it is possible to extract phosphoric acid in a yield as high as at least 90%, normally at least 95%, substantially without having the added sulfuric acid accompanied with the extracted solution.

The concentration of phosphoric acid in the solution in the extraction battery, gradually decreases as the solution mixture moves from the discharge stage of the extracted solution towards the discharge stage of the raffinate. On the other hand, the concentration of sulfuric acid gradually decreases as the solution mixture moves from the inlet of sulfuric acid towards the outlet of the extracted solution (provided that in the case wherein a sulfuric acid-containing material such as a wet process phosphoric acid is used as the feed material, the concentration of sulfuric acid again increases at the place near the discharge stage of the extracted solution.)

In the case where the $H_3PO_4$ concentration in the aqueous phase in this battery solution is within a range of from 0.5 to 3 mol/l, it is impossible to bring the yield of phosphoric acid to be at least 90% if sulfuric acid is added in such an amount as to form a portion where the free sulfuric acid concentration ($Y$(mol/l)) in the aqueous phase is smaller than $2.5-0.83X$ (wherein $X$ is the $H_3PO_4$ concentration (mol/l) in the aqueous phase at the place where the free sulfuric acid concentration in the aqueous phase is $Y$ mol/l. The same is true hereinafter.) On the other hand, if sulfuric acid is added in an amount to form a portion where its concentration is greater than $5.0-0.83X$, it is possible that sulfuric acid would accompany the extracted solution even if the number of stages between the inlet of sulfuric acid and the outlet of the extracted solution is increased. Accordingly, it is necessary that $Y$ and $X$ satisfy the relation represented by the formula $$5.0-0.83X \geq Y \geq 2.5-0.83X \quad (1)$$

However, it is impossible to have this relation satisfied by adding sulfuric acid to a place where the $H_3PO_4$ concentration in the aqueous phase exceeds 3 mol/l.

Indeed, if the amount of supply of the solvent is adjusted as mentioned above, it is possible to have the above formula (1) satisfied within the entire range of $0.5 \leq X \leq 3$ without necessity of delicate adjustments. For instance, if an adjustment is made to satisfy $Y \approx 3.75 - 0.83X$ (namely, e.g. $Y=2$ and $X=2$) at a certain point within the above-mentioned range of $X$, normally the formula (1) is satisfied within the above-mentioned entire range of $X$.

Extracted Solution

It is impossible to prevent an entry of a part of impurities contained in the feed of an impure phosphoric acid solution. The same is true with respect to sulfuric acid. As mentioned above, it is possible to prevent an entry of sulfuric acid into the extracted solution with respect to sulfuric acid added to the extraction battery to increase the yield. However, in the case where sulfuric acid is contained in the feed of the impure phosphoric acid solution, it is impossible to prevent an entry of a part of the sulfuric acid into the extracted solution.

Accordingly, in order to obtain a high purity phosphoric acid or phosphate solution from the extracted solution obtained by the present invention, it is necessary to preliminarily remove the impurities in the purification battery. However, in a case where phosphoric acid is extracted from a highly concentrated impure phosphoric acid solution as in the case of the present invention, it is more likely that the impurities are coextracted into the extracted solution, than the case where the extraction is made from a low concentration material. Accordingly, in order to sufficiently remove the impurities from this extracted solution, it is necessary to use a large amount of a wash solution. In this case, the amount of the aqueous phase discharged from the purification battery naturally becomes great. However, even if the amount of the aqueous phase is great, the aqueous phase can relatively easily be treated according to the present invention as the yield is high.

In a case where water or an aqueous phosphoric acid solution is used as the wash solution, it is difficult to completely remove anion impurities by the wash solution itself, although cation impurities can thereby be removed. In order to remove the anion impurities completely, oxides, hydroxides, carbonates or phosphates of an alkali metal or magnesium are added in the purification battery in an amount of at least 1.0 gram equivalent times of the anion impurities in the extracted solution from the extraction battery, whereby it is possible to remove not only the anion impurities but also cation impurities, and accordingly, the treatment of the highly concentrated impure phosphoric acid solution according to the present invention is further facilitated.

Now, the effectiveness of the present invention will be illustrated by Examples.

REFERENTIAL EXAMPLE 1

(Phase Separabilities by a Solvent Mixture and a Single Solvent)

An impure phosphoric acid solution was contacted with a solvent, and phosphoric acid was extracted with pure water from the solvent phase thereby obtained, whereby the solvent phase and the aqueous phase were obtained which underwent no further material transfer.

75 ml. of the solvent phase and 25 ml. of the aqueous phase thereby obtained were introduced into a messcylinder, vigorously stirred, and then left to stand still, and the time till two phases are completely separated, was measured. The results thereby obtained are shown in the following Table. The solvent mixture was adjusted for its composition so that the solubility of water therein was brought to 5.0 wt.% which is equivalent to that in n-octanol.

| Solvents | $H_3PO_4$ concentration (mol/l) in the solvent phase | |
|---|---|---|
| | 2 | 0.5 |
| MIBK/n-butanol | 1 min. 20 sec. | 45 sec. |
| DIPE/isobutanol | 1 min. 20 sec. | 50 sec. |
| n-octanol | 1 min. 10 sec. | 3 hours |

Note:
MIBK: methyl isobutyl ketone (the same is true hereinafter)
DIPE: diisopropyl ether (the same is true hereinafter)

REFERENTIAL EXAMPLE 2

(Selectivity of a Solvent Mixture and a Single Solvent)

50 ml. of an aqueous solution having an $H_3PO_4$ concentration of 2 mol./l and a $H_2SO_4$ concentration of 5 mol./l was contacted with 500 ml. of a solvent, and the distribution coefficients of phosphoric acid and sulfuric acid were measured. The results thereby obtained are shown in the following Table. The solubility of water in the solvent was 5 wt.% in each case as in the case of REFERENTIAL EXAMPLE 1.

| Solvents | Distribution coefficients | | Selectivity coefficients |
|---|---|---|---|
| | Phosphoric acid | Sulfuric acid | |
| MIBK/n-butanol | 0.171 | 0.070 | 2.44 |
| DIPE/isobutanol | 0.160 | 0.069 | 2.32 |
| n-octanol | 0.146 | 0.104 | 1.41 |

Note:
Distribution coefficient = Concentration in the solvent phase/Concentration in the aqueous phase
Selectivity coefficient = Distribution coefficient of phosphoric acid/Distribution coefficient of sulfuric acid Hereinafter, "part" means "part/time", and "%" and "ppm" for compositions are by weight. A stage number is counted from the inlet stage of either the solvent or the solvent phase.

EXAMPLES 1 TO 4 AND COMPARATIVE EXAMPLES 1 TO 5

A wet process phosphoric acid having the following composition or the same diluted with water to bring the $P_2O_5$ content to 45 wt.%, was subjected to the extraction, purification and stripping batteries for purification.

| | |
|---|---|
| $P_2O_5$ | 54% |
| $SO_4$ | 2.20% |
| F | 0.24% |
| Mg | 0.46% |
| Fe | 0.21% |
| Al | 0.14% |
| Ti | 30 ppm |
| Zn | 730 ppm |
| $SiO_2$ | 150 ppm |

In each battery, the operation was carried out countercurrently by means of a mixer-settler type extractor. Pure water was supplied to the stripping battery. 62 parts of the aqueous phase obtained by the stripping battery was supplied as a wash solution to the purification battery, and the rest of the aqueous phase was concentrated to bring the $P_2O_5$ concentration to 54% (this concentrated solution will hereinafter be referred to as "product phosphoric acid"). The whole aqueous phase discharged from the purification battery was mixed with 100 parts of the above-mentioned wet process phosphoric acid (the mixed solution will hereinafter be referred to as "mixed phosphoric acid"), and supplied to the extraction battery. Further, sulfuric acid having a concentration of 98% was supplied to the extraction battery.

The conditions other than the above-mentioned, and the results thereby obtained are shown in the following Table and FIG. 1. (FIG. 1 shows the relation between Y and X at $0.5 \leq X \leq 3$ or in the vicinity thereof.

| | EXAMPLE | | | |
|---|---|---|---|---|
| | 1 | 2 | 3 | 4 |
| Feed wet process phosphoric acid ($P_2O_5$ %) | 54 | 54 | 45 | 45 |
| Number of stages | | | | |
| Extraction battery | 10 | 10 | 10 | 8 |
| Purification battery | 10 | 10 | 15 | 12 |
| Stripping battery | 5 | 5 | 6 | 7 |
| Solvent | | | | |
| Solubility of water (%) | 4.4 | 5.5 | 7.5 | 9.0 |
| (parts) | 360 | 380 | 395 | 350 |
| Pure water (parts) | 113 | 115 | 96 | 101 |
| Mixed phosphoric acid | | | | |
| (parts) | 140 | 150 | 140 | 140 |
| ($H_3PO_4$ %) | 65.2 | 65.0 | 55.2 | 55.5 |
| Extracted solution | | | | |
| (parts) | 453 | 470 | 493 | 435 |
| ($H_3PO_4$ %) | 19.6 | 20.4 | 15.3 | 17.6 |
| ($SO_4$ %) | 0.078 | 0.075 | 0.090 | 0.099 |
| The stage in which sulfuric acid was added | | | | |
| (stage No) | 3 | 3 | 3 | 2 |
| Yield (%) | 96.6 | 97.8 | 96.8 | 98.2 |
| Impurities in the product phosphoric acid | | | | |
| ($SO_4$ %) | 0.15 | 0.14 | 0.17 | 0.19 |
| (F ppm) | 500 | 390 | 600 | 520 |
| (Mg ppm) | 2 | 2 | 2 | 2 |
| (Fe ppm) | 3 | 3 | 3 | 3 |
| (Al ppm) | 3 | 3 | 3 | 3 |
| (Ti ppm) | 2 | 2 | 2 | 2 |
| (Zn ppm) | 2 | 2 | 2 | 2 |
| ($SiO_2$ ppm) | 30 | 30 | 30 | 30 |

| | COMPARATIVE EXAMPLES | | | | |
|---|---|---|---|---|---|
| | 1 | 2 | 3 | 4 | 5 |
| Feed wet process phosphoric acid ($P_2O_5$ %) | 54 | 54 | 54 | 54 | 45 |
| Number of stages | | | | | |
| Extraction battery | 10 | 10 | 10 | 10 | 10 |
| Purification battery | 10 | 10 | 10 | 10 | 10 |
| Stripping battery | 5 | 5 | 5 | 4 | 7 |
| Solvent | | | | | |
| Solubility of water (%) | 4.4 | 4.4 | 4.4 | 1.9 | 14.8 |
| (parts) | 360 | 360 | 360 | 360 | 360 |
| Pure water (parts) | 106 | 115 | 113 | 51 | 113 |
| Mixed phosphoric acid | | | | | |
| (parts) | 140 | 140 | 140 | 140 | |
| ($H_3PO_4$ %) | 64.6 | 66.0 | 64.9 | 69.2 | |
| Extracted solution | | | | | |
| (parts) | 427 | 460 | 445 | 420 | |
| ($H_3PO_4$ %) | 16.1 | 19.9 | 18.1 | 14.6 | |
| ($SO_4$ %) | 0.053 | 0.48 | 0.56 | 0.035 | |
| The stage in which sulfuric acid was added | | | | | |
| (stage No) | 3 | 3 | 6 | 3 | 3 |

| | | | |
|---|---|---|---|
| Yield (%) | 71 | 98.5 | 86 | 52 |
| Impurities in the product phosphoric acid | | | | |
| (SO$_4$ %) | 0.15 | 1.00 | 1.53 | 0.12 |
| (F ppm) | | | | |
| (Mg ppm) | | | | |
| (Fe ppm) | | | | |
| (Al ppm) | | | | |
| (Ti ppm) | | | | |
| (Zn ppm) | | | | |
| (SiO$_2$ ppm) | | | | |

[1]The yield was represented by: (P$_2$O$_5$ in the product phosphoric acid/P$_2$O$_5$ in the feed wet process phosphoric acid) × 100.
[2]Solvents:
Example 1 and Comparative Examples 1 to 3: A mixture of MIBK/n-butanol = 80/20 (in volume ratio, the same is true hereinafter).
Example 2: A mixture of DIPE/isobutanol = 50/50
Example 3: A mixture of 2-ethyl hexanol/cyclohexanol = 50/50
Example 4: A mixture of MIBK/n-butanol = 55/45
Comparative Example 4: MIBK
Comparative Example 5: A mixture of MIBK/n-butanol = 20/80.
[3]Additional notes to Example 1:
Aqueous phase discharged from the purification battery: 40 parts H$_3$PO$_4$ in the raffinate: 45 g/l.
Aqueous phase obtainable in the stripping battery: 220 parts P$_2$O$_5$ therein: 33%
[4]As shown in FIG. 1, in each of Examples 1 to 4, the relation represented by the formula $5.0 - 0.83X \geq Y \geq 2.5 - 0.83X$ was satisfied within a range of $0.5 \leq X \leq 3$.
As shown in the above Table, the amount of sulfuric acid accompanying the extracted solution was minimal and the yield of phosphoric acid exceeded 95%.
[5]As shown in FIG. 1, in Comparative Example 1, the amount of sulfuric acid was deficient and the H$_3$PO$_4$ concentration in the aqueous phase at the supply stage exceeded 3.0 mol./l; whereas in Comparative Example 2, the amount of sulfuric acid was too much, and the free sulfuric acid concentration in the aqueous phase at $0.5 \leq X \leq 3$ was too high; and in Example 4, the solubility of water in the solvent was too low. Thus, in all of these cases, the requirements of the present invention were not satisifed. Accordingly, in Comparative Example 2, a part of sulfuric acid added was included in the extracted solution although the yield of phosphoric acid was adequate; and in Comparative Examples 1, 3 and 4, the yields of phosphoric acid did not reach 90% although the sulfuric acid added was not included in the extracted solution.
[6]In Comparative Example 5, the solubility of water in the solvent was too high, and a single phase was formed in the intermediate stages of the extraction battery, whereby the extraction operation was impossible.

EXAMPLE 5

A wet process phosphoric acid having the following composition was used as the feed; the number of stages in the purification was 15; 5.2 parts of an aqueous solution containing 48% of sodium hydroxide was added to the eighth stage thereof; and the amount of sulfuric acid added to the extraction battery was 1.6 times that of Example 1. The extraction was carried out with other conditions being the same as in Example 1. The composition of the product phosphoric acid thereby obtained was as shown below, and the relation between Y and X at $0.5 \leq X \leq 3$ was as shown in FIG. 1. Further, the yield was 97.6%.

| | Feed wet process phosphoric acid | Product phosphoric acid |
|---|---|---|
| P$_2$O$_5$ | 54% | 54% |
| SO$_4$ | 2.64% | 0.002% |
| F | 0.54% | 8 ppm |
| Mg | 0.92% | <1 ppm |
| Fe | 0.41% | <1 ppm |
| Al | 0.10% | <1 ppm |
| Ti | 170 ppm | <1 ppm |
| Zn | 30 ppm | <1 ppm |
| SiO$_2$ | 300 ppm | 5 ppm |
| Na | — | 1 ppm |

We claim:

1. A process for the solvent extraction of a crude phosphoric acid with an organic solvent which comprises counter-currently contacting an impure phosphoric acid solution containing at least 45 wt % of P$_2$O$_5$ with a partially water-miscible organic solvent in the presence of sulfuric acid and recovering a purified phosphoric acid wherein:
  (a) as said organic solvent, a solvent in which from 3 to 10 wt % of water is soluble is used, and
  (b) said sulfuric acid is added at a location wherein the H$_3$PO$_4$ concentration in the aqueous phase is at most 3 moles/liter in an amount so as to bring the relation between the free sulfuric acid concentration and the H$_3$PO$_4$ concentration in the aqueous phase at said location to satisfy the formula $$5.0 - 0.83X \geq Y \geq 2.5 - 0.83X$$

within the range of the H$_3$PO$_4$ concentration in the aqueous phase being from 0.5 to 3 moles/liter.

2. The process according to claim 1, wherein said solvent is a mixture of a solvent in which less than 3 wt % of water is soluble and a solvent in which more than 10 wt % of water is soluble.

3. The process according to claim 2, wherein said solvent is a mixtre of at least one solvent from aliphatic alcohols having at most 6 carbon atoms and alicyclic alcohols, and at least one solvent selected from aliphatic alcohols having from 7 to 10 carbon atoms, methyl isobutyl ketone and diisopropyl ether.

4. The process according to claim 1, 2 or 3, wherein the impure phosphoric acid solution containing at least 45 wt % of P$_2$O$_5$ is a wet process phosphoric acid.

* * * * *